(12) United States Patent

Immordino, Jr.

(10) Patent No.: US 11,028,597 B2
(45) Date of Patent: Jun. 8, 2021

(54) MAGNETIC FASTENER TECHNOLOGY FOR WALLBOARD PANELS

(71) Applicant: UNITED STATES GYPSUM COMPANY, Chicago, IL (US)

(72) Inventor: Salvatore C. Immordino, Jr., Trevor, WI (US)

(73) Assignee: UNITED STATES GYPSUM COMPANY, Chicago, IL (US)

(*) Notice: Subject to any disclaimer, the term of this patent is extended or adjusted under 35 U.S.C. 154(b) by 101 days.

(21) Appl. No.: 16/297,196

(22) Filed: Mar. 8, 2019

(65) Prior Publication Data

US 2019/0345723 A1 Nov. 14, 2019

Related U.S. Application Data

(60) Provisional application No. 62/669,661, filed on May 10, 2018.

(51) Int. Cl.
| | |
|---|---|
| *E04F 13/30* | (2006.01) |
| *E04F 13/08* | (2006.01) |
| *F16B 5/02* | (2006.01) |
| *A47G 1/17* | (2006.01) |
| *F16M 13/02* | (2006.01) |
| *F16B 43/00* | (2006.01) |

(52) U.S. Cl.
CPC ............ *E04F 13/0883* (2013.01); *F16B 5/02* (2013.01); *A47G 1/17* (2013.01); *F16B 2043/008* (2013.01); *F16M 13/02* (2013.01)

(58) Field of Classification Search
CPC .............. F16B 43/00; F16B 2001/0032; F16B 2001/0035; F16B 2043/008; E04F 13/0883; A47G 1/17

USPC ................. 411/531; 52/DIG. 4; 248/467
See application file for complete search history.

(56) References Cited

U.S. PATENT DOCUMENTS

| | | | | |
|---|---|---|---|---|
| 2,742,250 | A | * | 4/1956 | Cronberger ............... A47G 1/17 248/467 |
| 3,031,799 | A | | 5/1962 | Bradsby |
| 3,325,955 | A | | 6/1967 | Haut |
| 4,884,375 | A | | 12/1989 | Wendt |

(Continued)

FOREIGN PATENT DOCUMENTS

| | | |
|---|---|---|
| DE | 2903213 A1 | 7/1980 |
| EP | 1614827 A1 | 1/2006 |

(Continued)

OTHER PUBLICATIONS

Fingas, "LG's super-thin OLED screen sticks to your wall using magnets", http://www.engadget.com/2015/05/19/lg-oled-magnetic-mount/, May 20, 2015.

(Continued)

*Primary Examiner* — Flemming Saether
(74) *Attorney, Agent, or Firm* — Greer, Burns & Crain, Ltd.; Philip T. Petti; Pradip Sahu

(57) ABSTRACT

A fastener is provided and is configured for securing magnetized items to a wallboard panel. Included on the fastener is a fastener body having a first side and an opposite second side, and a counter-sunk throughbore extends from the first side to the second side. The body has a tapered peripheral edge. In addition, the first side is covered with wallboard joint tape.

15 Claims, 2 Drawing Sheets

(56) References Cited

U.S. PATENT DOCUMENTS

| | | | |
|---|---|---|---|
| 5,414,969 A | 5/1995 | Krejci et al. | |
| 5,476,559 A * | 12/1995 | Chiro | E04F 13/0883 156/310 |
| 5,643,510 A | 7/1997 | Sucech | |
| 5,925,204 A | 7/1999 | Hoffmann, Sr. | |
| 5,983,587 A | 11/1999 | Limonad | |
| 6,367,216 B1 | 4/2002 | Maylon | |
| 7,187,261 B2 | 3/2007 | Cassar | |
| 7,209,021 B2 * | 4/2007 | Clement | A47G 1/17 335/285 |
| 7,866,931 B2 * | 1/2011 | Murtha | F16B 43/00 411/546 |
| 8,197,952 B2 | 6/2012 | Yu et al. | |
| 8,400,017 B2 | 3/2013 | Kurs et al. | |
| 8,999,478 B1 | 4/2015 | Medlen | |
| 9,284,973 B2 * | 3/2016 | Hoffman | F16B 35/04 |
| 9,567,794 B2 | 2/2017 | Medlen | |
| 9,849,649 B2 | 12/2017 | Immordino et al. | |
| 9,926,708 B1 * | 3/2018 | Janko | A47G 3/00 |
| 2003/0150190 A1 | 8/2003 | Schroth | |
| 2005/0204672 A1 | 9/2005 | Hansen | |
| 2009/0320407 A1 | 12/2009 | Johansson | |
| 2013/0002191 A1 | 1/2013 | Jung et al. | |
| 2013/0291366 A1 | 11/2013 | Hoffman | |
| 2017/0093215 A1 | 3/2017 | Ng | |
| 2019/0186686 A1 * | 6/2019 | Sisto | A47B 96/061 |

FOREIGN PATENT DOCUMENTS

| | | |
|---|---|---|
| GB | 2102405 A | 2/1983 |
| WO | 2009/010160 A2 | 1/2009 |

OTHER PUBLICATIONS

"IPort LanchPort WallStation"; Amazon (Feb. 12, 2012); <https://www.amazon.com/iPort-WallStation-LanchPort-White/dp/B007P6ROOQ/ref=sr_1_2/144-0619328-0273922?ie=UTF8&qid=1501590119&sr=8-2&keywords=iport+launchport>.

* cited by examiner

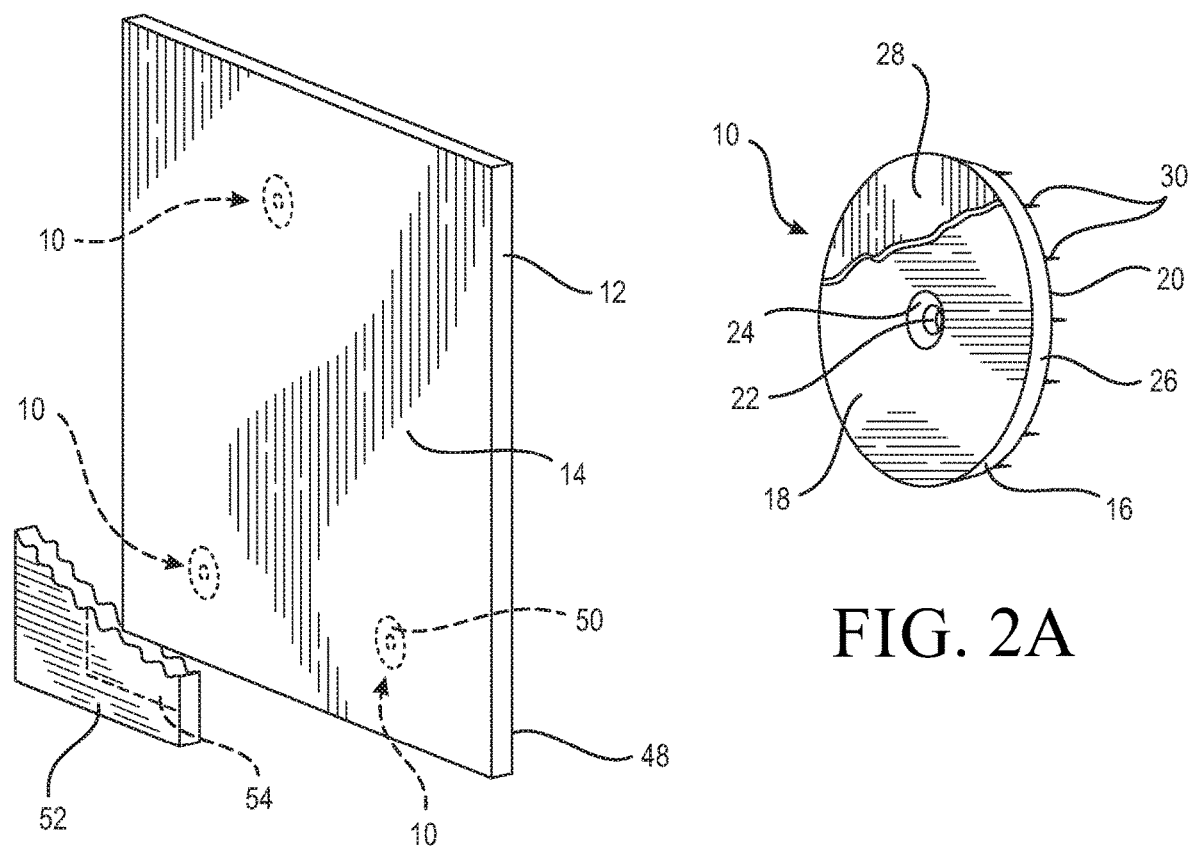
FIG. 2A
FIG. 1
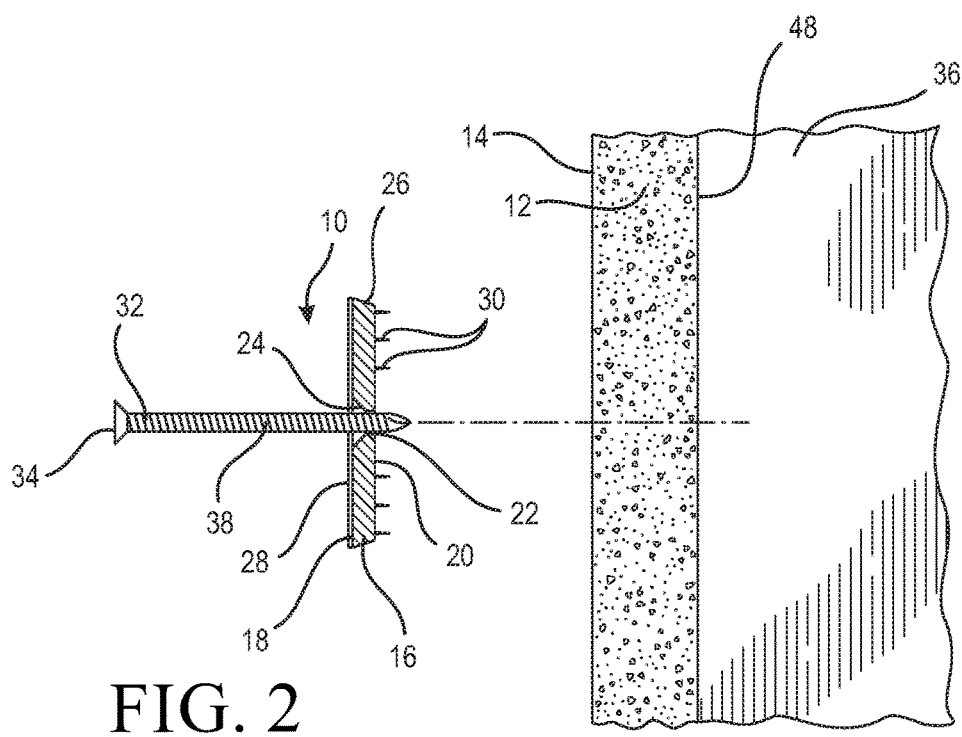
FIG. 2

MAGNETIC FASTENER TECHNOLOGY FOR WALLBOARD PANELS

RELATED APPLICATION

The present application claims 35 USC 119 priority from U.S. Provisional Application Ser. No. 62/669,661 filed May 10, 2018, which is incorporated by reference.

BACKGROUND

The present invention relates to interior wall construction, and more specifically to technology used for mounting objects to wallboard panels.

Wallboard panels, and more particularly, gypsum wallboard panels, are commonly utilized in building construction. These panels, including a core of gypsum coated with face and backing sheets of paper, are commonly used to construct walls, ceilings, partitions and in many other applications. It is well known in the art that wallboard panels are optionally made of other materials besides gypsum.

Wallboard panels provide many advantages in construction: they are light-weight, yet fire-resistant and easy to install. Due to the widespread use of gypsum wallboard panels as interior walls and ceilings, there is often a need to attach various objects to the panels, such as for example, framed photos or paintings, light fixtures, wireless speakers and flat TV screens. Conventionally, attaching an object to a wall or ceiling requires fasteners such as nails or screws, and related hooks or brackets. However, after the object is no longer needed and is removed from the wallboard panel, the panel's surface remains damaged, with a hole left in the place where the fastener used to be. Restoring the damaged wallboard panel typically requires patching a hole with at least one coat of spackle or joint compound, sanding it and then painting over the patch to blend the repaired area with the rest of the panel. However, even after all these steps, the damaged panel may still continue to look uneven.

A system for embedding magnetic grids in wallboard panels is disclosed in commonly-assigned U.S. Pat. No. 9,849,649, incorporated by reference. While the disclosure in that patent is useful, there is still a need for a more economical embodiment. Thus, there is a need for new ways of attaching various objects to a wallboard panel without the use of conventional fasteners.

SUMMARY

The above-listed need is met or exceeded by the present fastener for use in securing magnetized items to a wallboard panel. Once the present magnetized surfaces are attached to the wall in locations determined by the user, magnetic ornaments including but not limited to framed photos or paintings, wireless speakers, digital picture frames, computer display monitors, flat screen TV's and the like having magnetic surfaces are attachable to the present fastener without the use of conventional hooks, and brackets. An important feature of the present fastener is that it includes an exterior layer of wallboard joint tape, and is embedded into the wallboard panel and finished using conventional wallboard joint compound. The diameter of the present fastener varies with the size of the object to be mounted on the wall. Thus, while the ornaments are securely held to the wall while their presence is desired by the user, once a change is considered appropriate, the magnetized ornament is removed without revealing any damage to the wallboard panel surface, since the present fastener remains in place.

In addition, the present fastener is securable to the panel whether or not there is a supporting stud located behind the wallboard panel at the desired location of the fastener. If a stud is not present, the present fastener is securable using conventional anchors, Umbrella Patch® wall repair patches, membranous body wall repair patches or moly bolts, collectively referred to in this application as anchor technology.

More specifically, a fastener is provided and is configured for securing magnetized items to a wallboard panel. Included on the fastener is a fastener body having a first side and an opposite second side, and a counter-sunk throughbore extends from the first side to the second side. The body has a peripheral edge having an inclined edge. In addition, the first side is covered with wallboard joint tape.

In an alternate embodiment, at least one formation projects from the second side for enhancing gripping attachment between the fastener and the wallboard panel and for preventing rotation of the fastener on the wallboard panel. In one embodiment, the formation is a plurality of teeth. Also, the body is preferably magnetic material, more preferably neodymium, and the joint tape is preferably one of paper and fiberglass mesh.

In another embodiment, a fastener is provided that is configured for securing magnetized items to a wallboard panel. Included on the fastener is a fastener body made of neodymium, having a first side covered with wallboard joint tape and an opposite second side, and a counter-sunk throughbore extending from the first side to the second side. A peripheral edge of the body has an inclined edge. At least one formation projects from the second side for enhancing gripping attachment between the fastener and the wallboard panel and preventing rotation of the fastener on the wallboard panel. A fastener engages the throughbore, and has a head dimensioned to seat in the counter-sunk throughbore and be flush with the first side.

BRIEF DESCRIPTION OF THE DRAWINGS

FIG. 1 is a front perspective view of a wallboard panel equipped with several of the present magnetic fasteners and showing an ornamental item to be suspended from the panel exploded away;

FIG. 2 is a fragmentary exploded vertical cross-section showing the present fastener being secured to a portion of a wallboard panel with a stud behind the panel;

FIG. 2A is a front perspective view of the present fastener;

DETAILED DESCRIPTION

Figure 3:
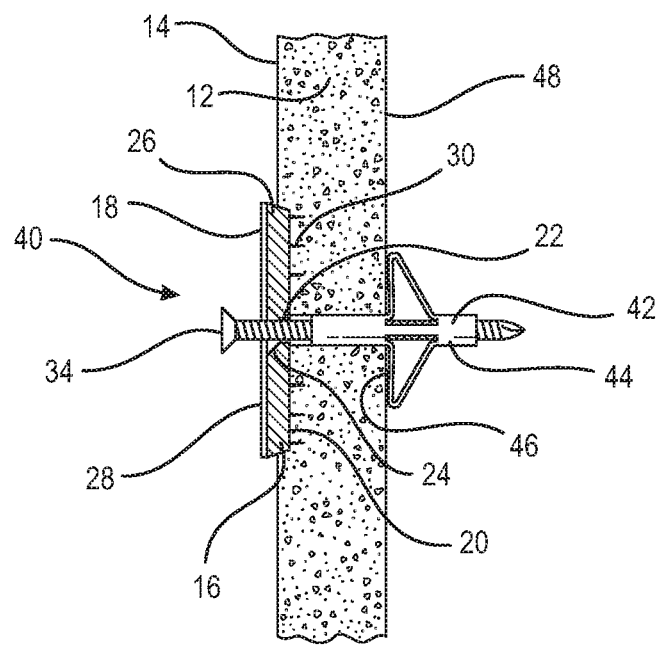
FIG. 3 is a fragmentary vertical cross-section of an alternate embodiment to that shown in FIG. 2, wherein the present fastener is shown secured to the wallboard panel with anchor technology.

Referring now to FIGS. 1, 2, 2A and 4, the present fastener, generally designated 10, is shown mounted to a wallboard panel 12. It is important to note that the present fastener 10, once secured to the wallboard panel 12, is flush with a front or face surface 14 of the panel.

Included on the fastener 10 is a fastener body 16 having a first side 18 and an opposite second or rear side 20. A counter-sunk throughbore 22 extends from the first side to the second side and defines a countersunk seat 24 on the first side 18. A feature of the body 16 is that it includes an inclined peripheral edge 26. In other words, the peripheral edge 26 is tapered or inclined downward towards the wallboard panel 12 as the fastener 10 is viewed from the side, and the first side 18 of the body has a larger diameter than the second side 20 of the body.

Another feature of the present fastener 10 is that the first side 18 is covered with a layer of wallboard joint tape 28 which is contemplated as being either paper or mesh-based, as is well known in the art. Since it is important that the fastener body 16 be magnetic for holding items to the wallboard panel 12, it is preferred that the body be made of a strong magnetic material. While neodymium is the preferred material for the body 16, other strong magnetic materials are contemplated, including, but not limited to Polymagnets available from Correlated Magnetics Research, LLC, Huntsville, Ala. 35806 USA (www.polymagnet.com). A suitable chemical adhesive (not shown) is used to secure the wallboard joint tape 28 to the first side 18. For securing larger objects or items to the wallboard panel 12, it is contemplated that the diameter of the fastener body 16 is correspondingly increased. Also, additional fasteners 10 are installed on the panel 12 when especially heavy objects or items are to be suspended.

Another preferred feature of the present fastener 10 is that at least one, and preferably a plurality of gripping formations 30 projects from the second side 20 of the fastener body 16 for enhancing gripping attachment between the fastener and the wallboard panel 12, and also for reducing the tendency for or preventing the fastener 10 from rotating or spinning relative to the panel. It is preferred that the formations 30 are integrally formed with the fastener body 16. While a number of variations in shapes of the formations 30 are considered suitable for this function, including ribs, checkering, etching, scratching, rings, etc., in the preferred embodiment, the gripping formations 30 are rearwardly-projecting sharp teeth.

Figure 4:
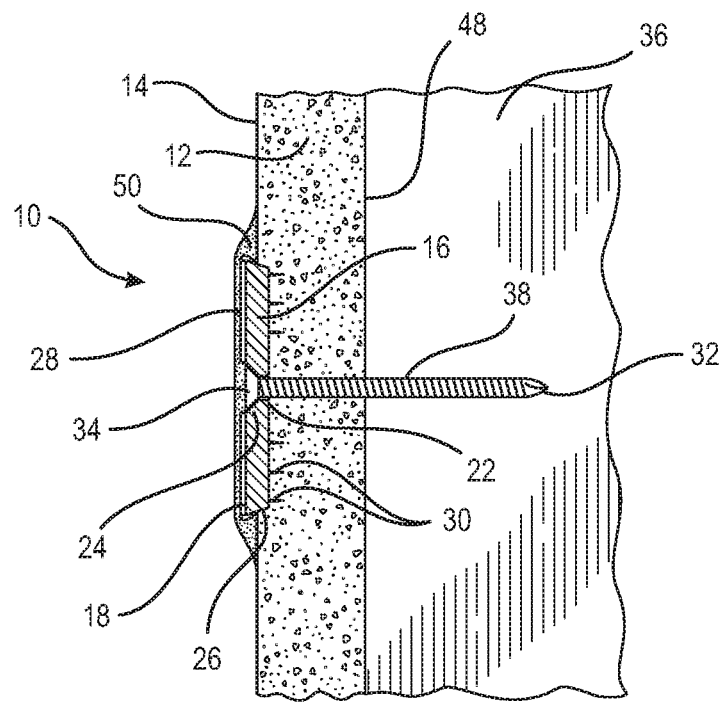
FIG. 4 is a schematic vertical cross-section view as seen in FIG. 2, showing the present magnetic fastener secured to the wallboard panel and being surface finished.

The fastener 10 is secured in place on the wallboard panel by a threaded fastener 32 having a head 34 dimensioned to engage the countersunk seat 24 so that, once fully tightened against the panel, the head 34 is flush with the first side 18 of the body 16 (FIG. 4). As is well known in the art, wallboard panels 12 are supported by an underlying frame including vertical studs 36 made of metal or wood. Such studs 36 are regularly spaced in vertical, parallel arrangement depending on the local building code. Assuming that the desired location for the item to be hung, and the fastener 10 is in front of a stud 36, the threaded fastener 32 includes a threaded shaft 38 that penetrates the stud.

Referring now to FIG. 3, an alternate embodiment of the fastener 10 is generally designated 40. Components shared with the fastener 10 are identified with identical reference numbers. The fasteners 10 and 40 are generally identical. A main difference between the fasteners 10 and 40 is that the latter is positioned on the wallboard panel 12 where there is no supporting stud 36. Accordingly, the threaded fastener 32 is replaced with a fastener 42 having an anchor 44. As described above, the anchor 44 is one example of anchor technology, whereby various structures are used to secure a threaded fastener to a wallboard panel in an area without a backing stud. However, other types of anchor technology are contemplated, including but not limited to so-called umbrella wall patch or anchors, as well as the devices disclosed in U.S. Pat. Nos. 3,325,955; 5,983,587 and US 2005 0204672, all of which are incorporated by reference.

As seen in FIG. 3, a desired feature of suitable anchor technology is a generally vertical support surface 46 on the anchor 44 which engages a rear surface 48 on the wallboard panel 12. As the fastener 40 is tightened, the support surface 46 is drawn against the rear surface 48, enhancing the connection between the fastener 40 and the wallboard panel 12.

As seen in FIGS. 1 and 4, upon full installation of the fastener 32, 42, the head 34 is engaged in the countersunk seat 24 and is flush with the front face 14 of the wallboard panel 12. Since the first or front side 18 of the fastener body 16 is covered with joint tape 28, the installation of the fastener 10, 40 is accomplished using conventional wallboard finishing techniques, including application of wallboard joint compound 50, sanding and painting. Also, due to the tapered shape of the peripheral edge 26 of the fastener body 16, as the threaded fastener 32 is tightened, the body has a tendency to sink into the front surface 14 of the wallboard panel. It is to be appreciated that the mounded nature of the present fastener 10 is exaggerated somewhat in FIG. 4, and in reality the installation appears flatter and blends in with the front surface 14 of the wallboard panel 12.

Referring again to FIG. 1, once the fastener 10, 40 is installed and the wall suitably finished, an item 52, such as a wireless speaker, framed photo, painting, flat screen TV, work of art or the like with a magnetic backing 54 (shown hidden) is secured to the wallboard panel 12 at the location of the fastener. The item 52 is held in place by magnetic force until the user desires removal of the item. For suitably securing heavier items 52 to the wallboard panel 12, the diameter of the fastener body 16 is increased, as well as the number of fasteners 10, depending on the application. In a preferred embodiment, the holding force of the magnetic fastener body 16 is sufficiently strong that the user rotates the item 52 about an axis normal to the wallboard panel front face 14 to break the magnetic attachment.

While a particular embodiment of the present magnetic fastener technology for wallboard fasteners has been described herein, it will be appreciated by those skilled in the art that changes and modifications may be made thereto without departing from the invention in its broader aspects and as set forth in the following claims.

The invention claimed is:

1. A fastener configured for securing magnetized items to a wallboard panel, comprising:
    a fastener body having a first side and an opposite second side, a counter-sunk throughbore extending from said first side to said second side, said first side of said fastener body has a width and said fastener body has a thickness defined by a distance between said first side and said second side, wherein said width of said first side is greater than said thickness;
    said body having a tapered peripheral edge; and
    a layer of wallboard joint tape secured to said first side of said fastener body prior to installing the fastener in the wallboard panel.

2. The fastener of claim 1, further including at least one formation projecting outwardly from said second side for enhancing gripping attachment between said fastener and the wallboard panel.

3. The fastener of claim 2, wherein said at least one formation is a plurality of teeth.

4. The fastener of claim 1, wherein said body is made of magnetic material.

5. The fastener of claim 4, wherein said magnetic material is neodymium.

6. The fastener of claim 1, further including a threaded fastener having a head dimensioned for seating in said countersunk throughbore in said first side.

7. The fastener of claim 6, further including an anchor fastener secured to an end of said threaded fastener opposite said head.

8. The fastener of claim 1, wherein said joint tape is one of paper and mesh-based.

9. The fastener of claim 1, wherein a first side of said fastener body has a larger diameter than a second side of said body.

10. The fastener of claim 1, wherein a shape of said first side of said fastener body and a shape of said layer of wallboard joint tape are the same.

11. A fastener configured for securing magnetized items to a wallboard panel, the fastener comprising:
- a fastener body made of neodymium, having a first end and an opposing second end, a counter-sunk throughbore extending from said first end to said second end, wherein said second end is substantially flat;
- said body having a tapered peripheral side, said tapered peripheral side extending between said first end and said second end;
- said first end being covered with wallboard joint tape prior to installing the fastener in the wallboard panel;
- at least one formation projecting outwardly from said second end for enhancing gripping attachment between said fastener and the wallboard panel; and
- a securing fastener engaging said throughbore, and having a head dimensioned to seat in said counter-sunk throughbore and be flush with said first end.

12. The fastener of claim 11, wherein said at least one formation is a plurality of teeth.

13. The fastener of claim 11, wherein said joint tape is one of paper and mesh-based.

14. The fastener of claim 11, wherein said at least one formation is transverse to said second end.

15. The fastener of claim 11, wherein said first end of said fastener body has a width and said fastener body has a thickness defined by a distance between said first end and said second end, wherein said width of said first end is greater than said thickness.

* * * * *